Aug. 19, 1930.  A. R. KRAUSE ET AL  1,773,364
INNER TUBE STRIPPING MACHINE
Filed Aug. 18, 1927   10 Sheets-Sheet 1

Inventors
Arnold R. Krause
Alfred C. Hirsch

Aug. 19, 1930.  A. R. KRAUSE ET AL  1,773,364
INNER TUBE STRIPPING MACHINE
Filed Aug. 18, 1927    10 Sheets-Sheet 8

Inventors
Arnold R. Krause
Alfred C. Hirsch

Patented Aug. 19, 1930

1,773,364

UNITED STATES PATENT OFFICE

ARNOLD R. KRAUSE AND ALFRED C. HIRSCH, OF EAU CLAIRE, WISCONSIN, ASSIGNORS TO GILLETTE RUBBER COMPANY, OF EAU CLAIRE, WISCONSIN, A CORPORATION OF WISCONSIN

INNER-TUBE-STRIPPING MACHINE

Application filed August 18, 1927. Serial No. 213,776.

This invention relates to a device for stripping rubber tubes from the tubes or mandrels upon which the tubes are vulcanized prior to splicing the ends of the tube together to form the inner tubes for pneumatic tires.

It is an object of this invention to provide an improved machine for automatically performing the operations of stripping a vulcanized tube from its mandrel. In order to accomplish this result, a tube mandrel is guided in line with a pneumatic stripping nozzle, stripping rollers acting to roll back one end of the tube onto the end of the nozzle, the loop of tube so turned back being inflated by air introduced through the nozzle to separate the two layers of tube while the mandrel is being forced through the nozzle, the tube being thus turned inside out during the stripping operation.

It is also an object of this invention to provide an improved form of stripping nozzle having a flexible air seal that will conserve the amount of air required to inflate the tube during the stripping operation.

It is another object of this invention to provide means for driving and releasing the stripping rollers, whereby on the return movement of the tube mandrel the rollers will not be driven in opposition to the movement thereof.

Other and further important objects of this invention will become apparent from the disclosures in the drawings and specification.

This invention (in a preferred form) is illustrated in the drawings and hereinafter more fully described.

On the drawings:

Figure 5 is an enlarged vertical section on the line V—V of Figure 3.

As shown on the drawings:

The device of this invention may be conveniently divided into three sections for purposes of description. The first section comprises the centering and feeding mechanism for pushing a loaded mandrel through the stripping mechanism, which forms the second division. The stripped mandrel is then supported as it emerges from the nozzle and is finally ejected from the machine.

Figures 1, 2:
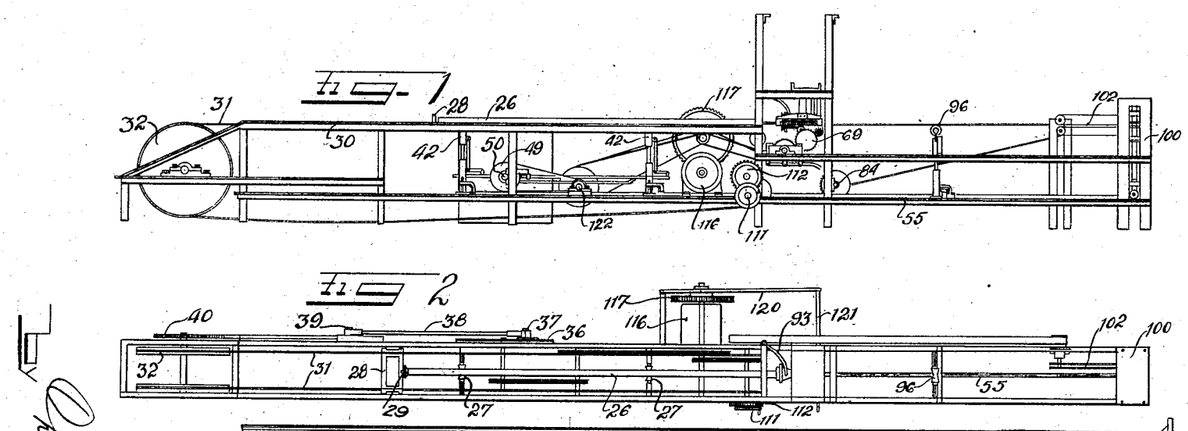
Figure 1 is a side elevation of a machine embodying the features of this invention.
Figure 2 is a plan view thereof.
Figure 3:
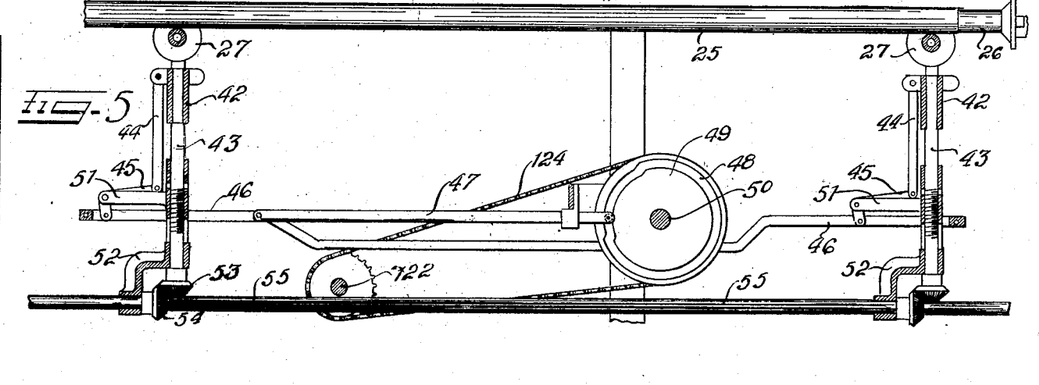
Figure 3 is a fragmentary plan view of the guide roller elevating mechanism on the line III—III of Figure 4.
Figures 3, 4:
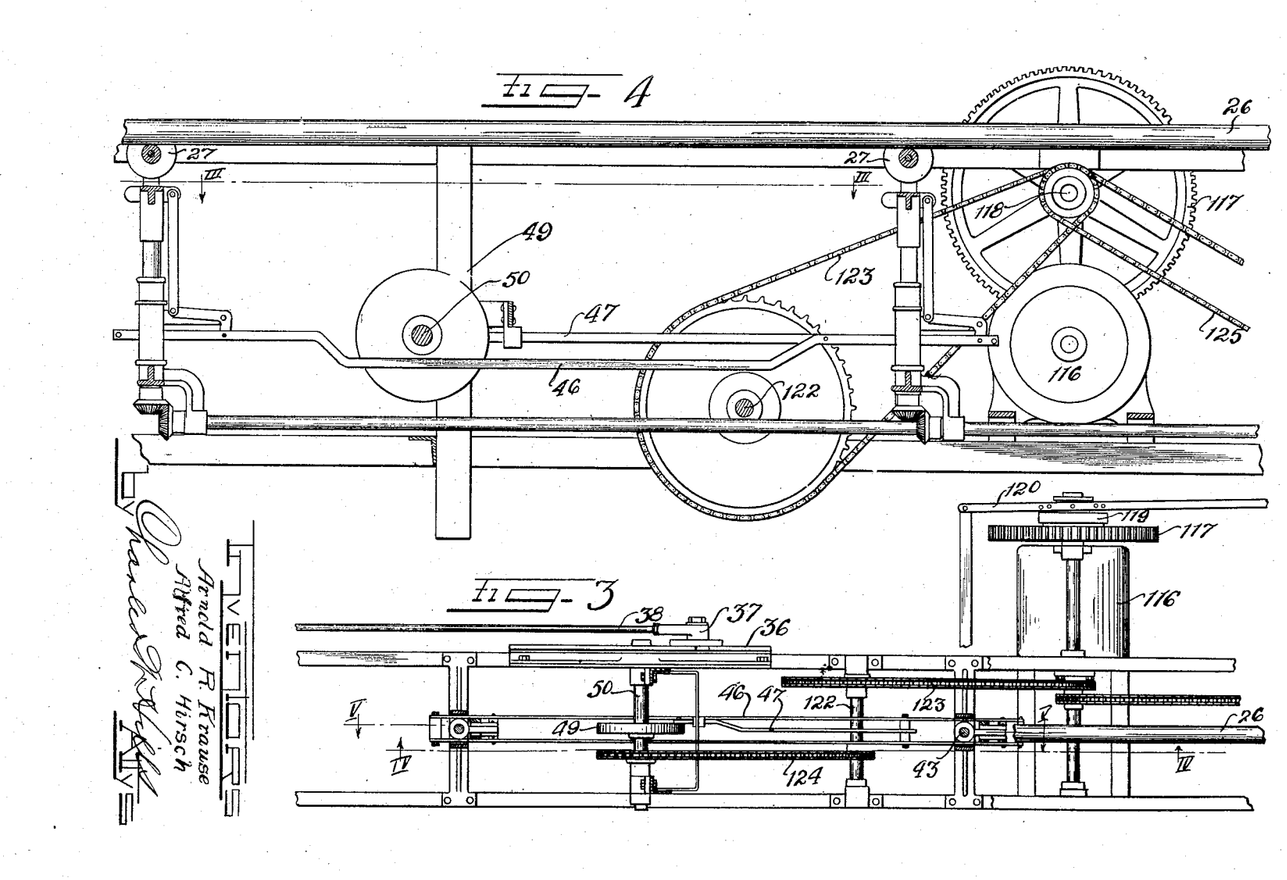
Figure 4 is an enlarged vertical section on the line IV—IV of Figure 3.

A completed but unspliced pneumatic inner tube 25 is shown on its pole or mandrel 26 as it comes from the vulcanizing apparatus, the mandrel comprising a steel tube varying in diameter and length according to the size of rubber tube being manufactured. The mandrel with its tube is placed on a pair of double tapered guide rollers 27, the supports for which will be described hereinafter. These rollers 27 support the mandrel while a carriage 28 having a conical center 29 advances the mandrel until its forward edge enters the stripping nozzle when the guide rollers are lowered to permit the carriage 28 to pass thereover, the carriage advancing along guide ways 30 and being propelled by ropes 31 on either side which pass over large diameter driving sheaves 32 on a shaft 33 at the extreme left of Figure 1 and over two pairs of smaller idler sheaves 34 and 35 immediately adjacent the stripping nozzle location.

Figure 7:
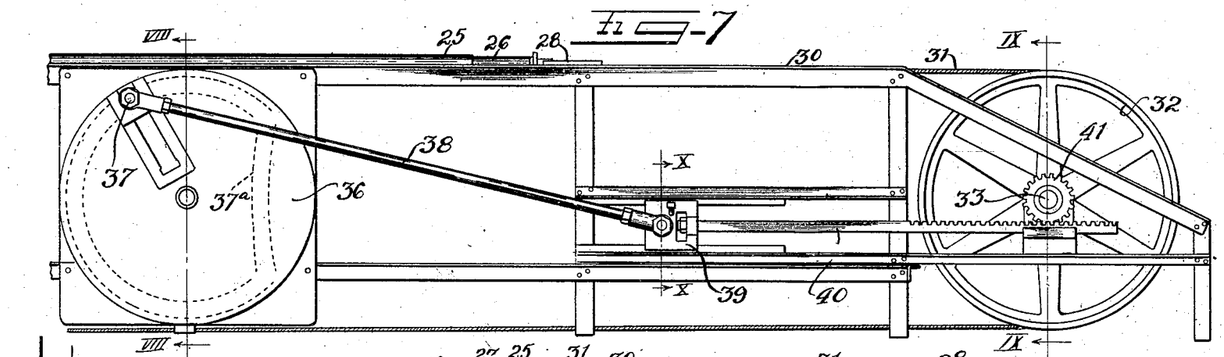
Figure 7 is an enlarged fragmentary elevation of the carriage advancing mechanism for pushing the mandrel through the nozzle.
Figure 8:
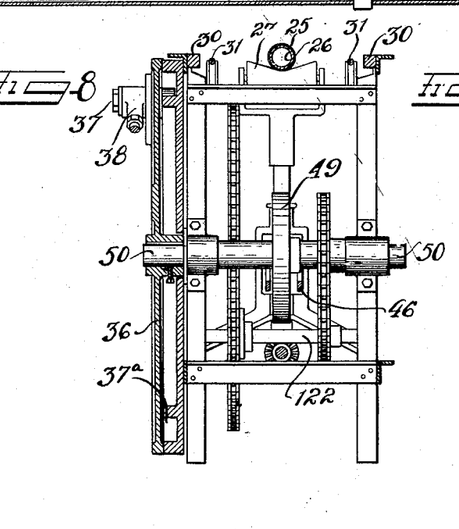
Figure 8 is an enlarged section on the line VIII—VIII of Figure 7.
Figures 9, 10:
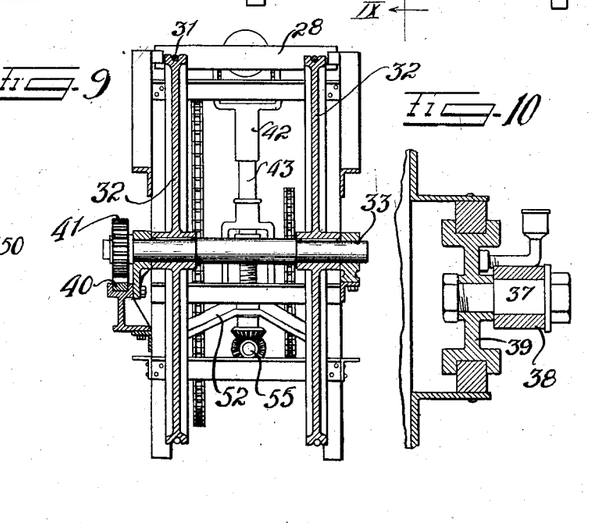
Figure 9 is an enlarged section on the line IX—IX of Figure 7.
Figure 10 is an enlarged section on the line X—X of Figure 7.

Figure 7 shows the driving mechanism for the sheaves 32 and carriage 28, a crank disc 36 carrying a variable radius crank pin 37, the crank pin forming a quick return by means of the cam groove 37$^a$ shown in dotted lines in Figure 7, operating a connecting rod 38 leading to a crosshead 39 shown in section in Figure 10 which reciprocates a rack 40 meshing with a gear 41 keyed to the sheave shaft 33, the sheaves 32 being thus alternately rotated equal amounts in both directions to cause the feeding carriage to move back and forth over its guide ways.

The double tapered guide rollers 27 are carried in heads 42 which are vertically movable on the shafts 43 by means of links 44 and bell cranks 45 simultaneously actuated by tie rods 46 which are shifted by a cam rod 47 riding in a cam groove 48 in a plate 49 keyed to a shaft 50, which also carries the crank disc 36, which operates the carriage 28 so that the guide rollers are dropped at the proper period relative to the carriage movement.

Figures 18, 19:
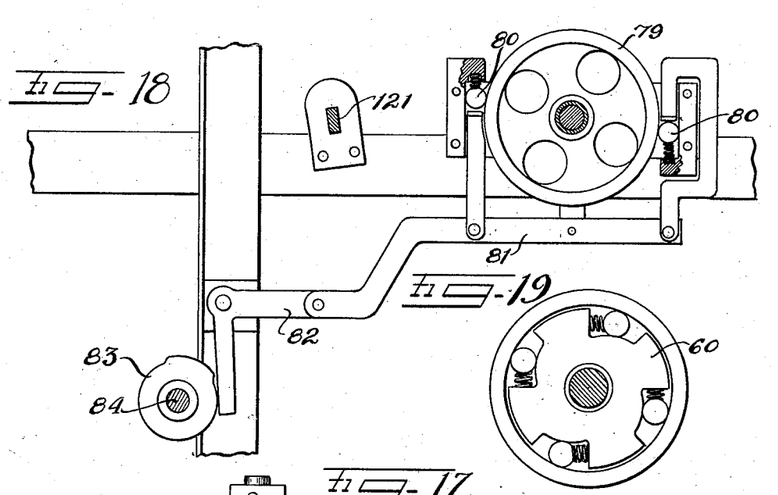
Figure 18 is a section on the line XVIII—XVIII of Figure 17.
Figure 19 is a detail of the one way clutch used on the stripping rollers.
Figure 20:
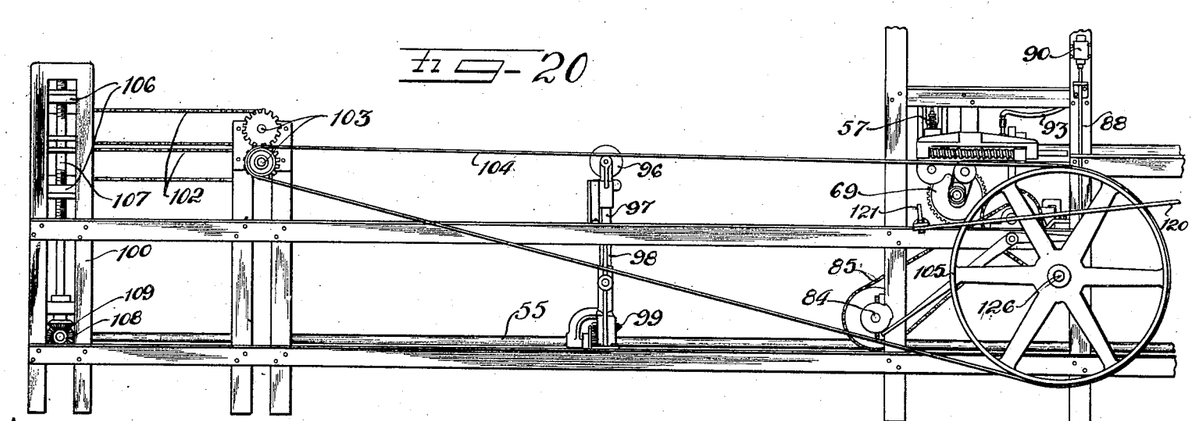
Figure 20 is an elevation of the delivery end of the device.
Figure 21:
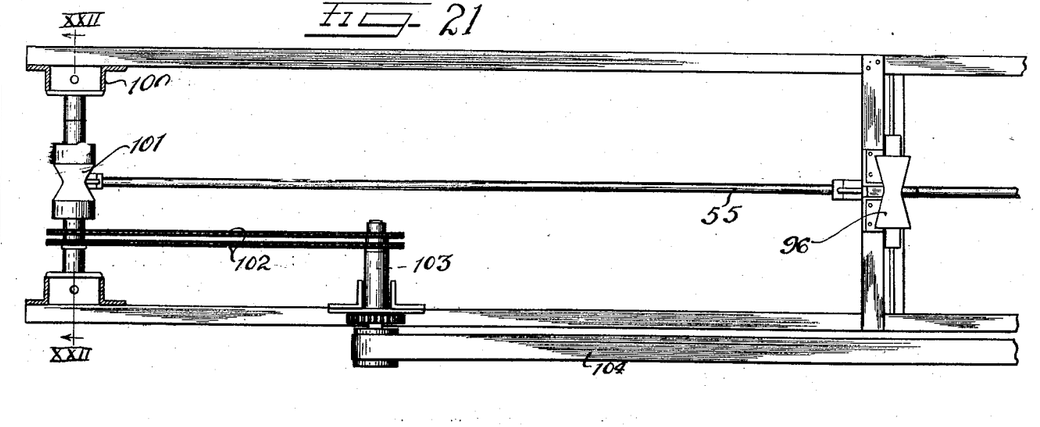
Figure 21 is a plan view thereof.

The shafts 43 are threaded to receive bell crank fulcrums 51 and are journaled in standards 52, the shafts 43 carry bevel gears 53 at their lower ends meshing with similar gears 54 on a longitudinal shaft 55 which is used to adjust the height of the guide rollers to center mandrels of different diameters in the stripping nozzle. The stripping mechanism proper comprises upper and lower stripping rollers 56 between which the mandrel is pushed, the upper roller being pressed down by a spring 57 acting against a frame 58 in which is journaled the lower roller, the frame being pivoted to float to equalize the roller pressure. Both rollers are driven by gears 59 acting through one way ball or roller clutches 60, a clutch being detailed in Figure 19. The clutches act to drive the rollers against the direction of motion of the mandrel so that when they contact the advancing end of the rubber tube 26 they turn it back; at the same time the point 61 of a conical stripping nozzle 62 is advanced into position beneath the turned back end 63 of the tube, as shown in Figure 15, the rollers holding the tube on the nozzle while the mandrel is pushed entirely therethrough.

Figure 15:
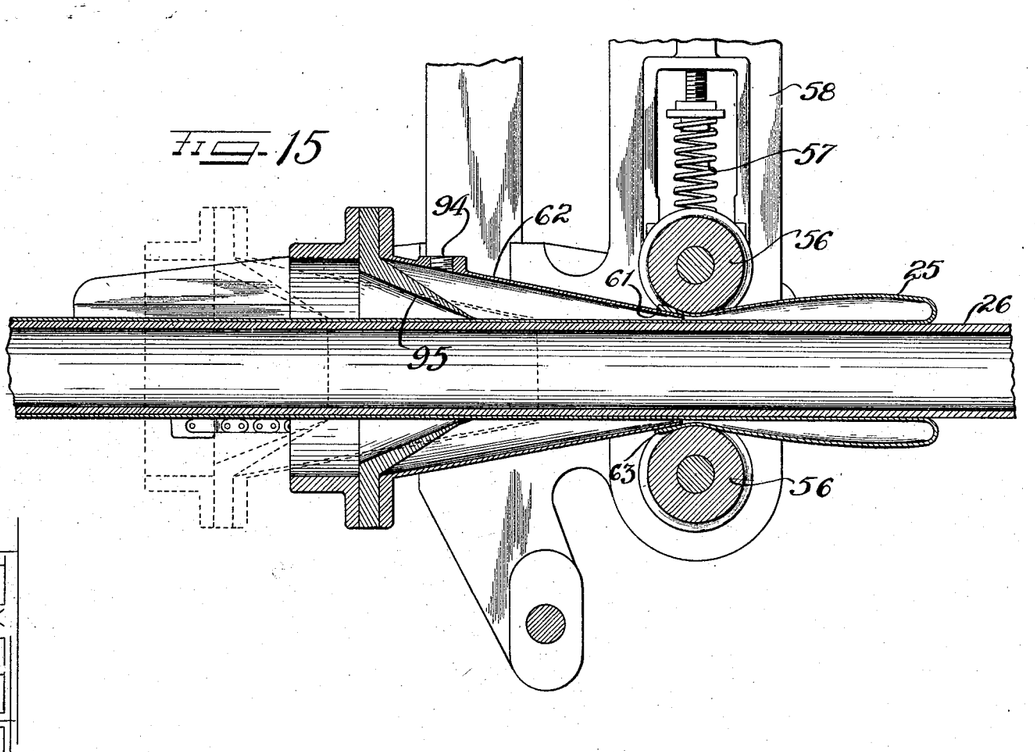
Figure 15 is an enlarged section of the pneumatic stripping nozzle showing the retracted position thereof in dotted lines.
Figure 17:
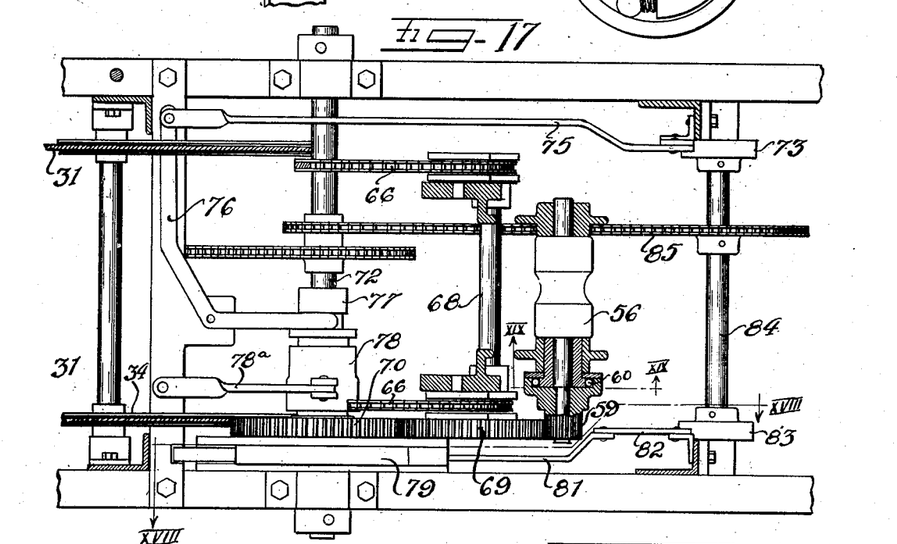
Figure 17 is a section on the line XVII—XVII of Figure 11, the parts being turned around.

The stripping nozzle 62 is mounted on slides 64 and is normally retracted into the dotted position shown in Figure 15 by springs 65. At the proper time, the nozzle is pulled into position by means of chains 66 operating over sheaves 67, the chains being wound up on a shaft 68 carrying a gear 69 which meshes with a gear 70 carrying a jaw clutch 71, both free on a shaft 72, which is engaged by the movable jaw 77, which is keyed to the shaft 72, by a cam 73 acting through levers 75 and 76. Gear 70, when the clutch is engaged, drives gear 69; which in turn drives the stripping rollers; the rotation of gear 69 winding up the nozzle chains 66 and thus pulling the nozzle up to the stripping rollers while they are starting to rotate, turning the end of the tube over onto the advancing nozzle end where it is held by the stripping rollers until the tube has been stripped off the mandrel.

A nut 78 is threaded on the exterior of the clutch 71 and is held against rotation by a link 78$^a$ so that when the gear 70 rotates, the nut 78 is screwed up against a shoulder 77$^a$ on the movable jaw 77 of the clutch thereby disengaging the clutch after a predetermined period of rotation. With this clutch disengaged, the nozzle and stripping rollers are held stationary in their engaged position by a non-reversing brake on the shaft 72, this brake comprising a one way ball or roller clutch 79 shown in Figure 18, the balls or rollers 80 being releasable by a lever 81 and bell crank 82 acted upon by a cam 83 when the stripping operation is completed, whereupon the nozzle is released and returns to its starting position. Both the cams 73 and 83 are carried by a master control shaft 84 driven by the chain 85 from the clutch shaft 72.

Figures 6, 16, 22, 23:
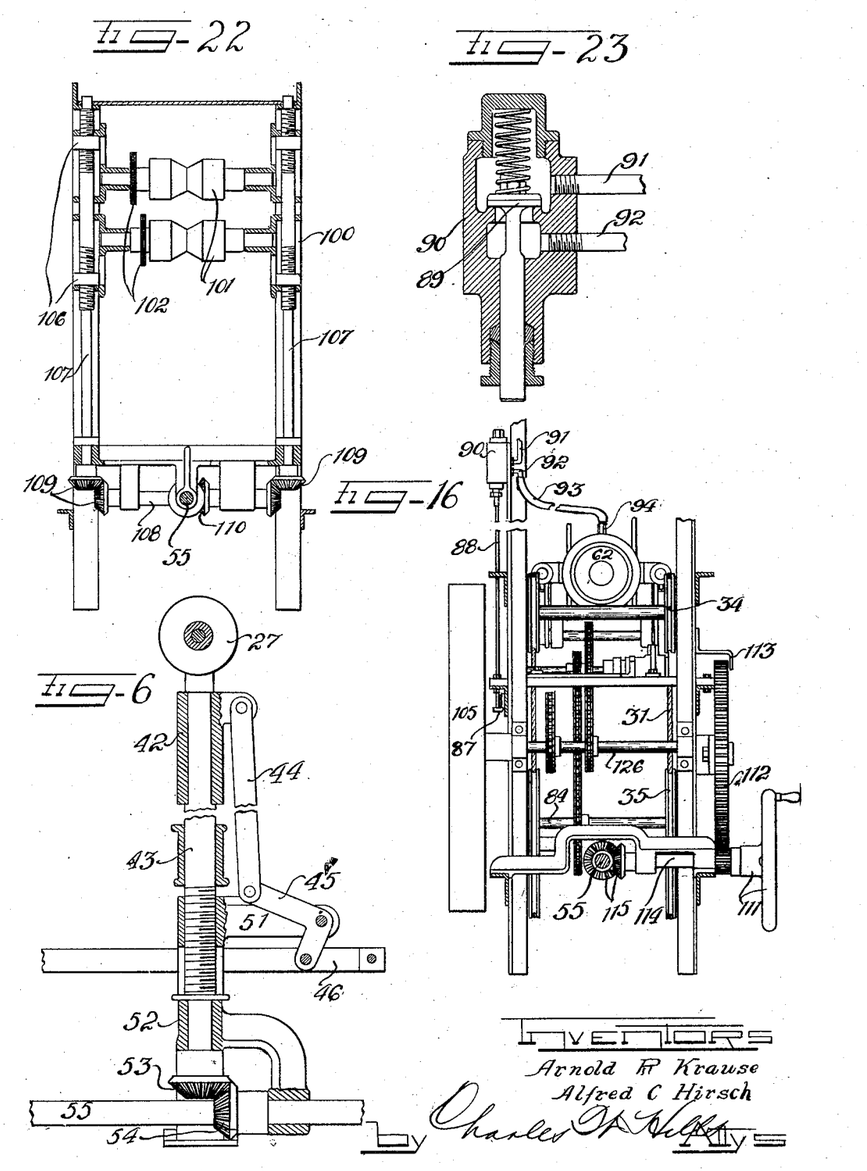
Figure 6 is a detail section of one of the guide rollers.
Figure 16 is a section on the line XVI—XVI of Figure 11.
Figure 22 is a section with parts in elevation taken on the line XXII—XXII of Figure 21.
Figure 23 is a section of the air control valve for the nozzle.
Figure 11:
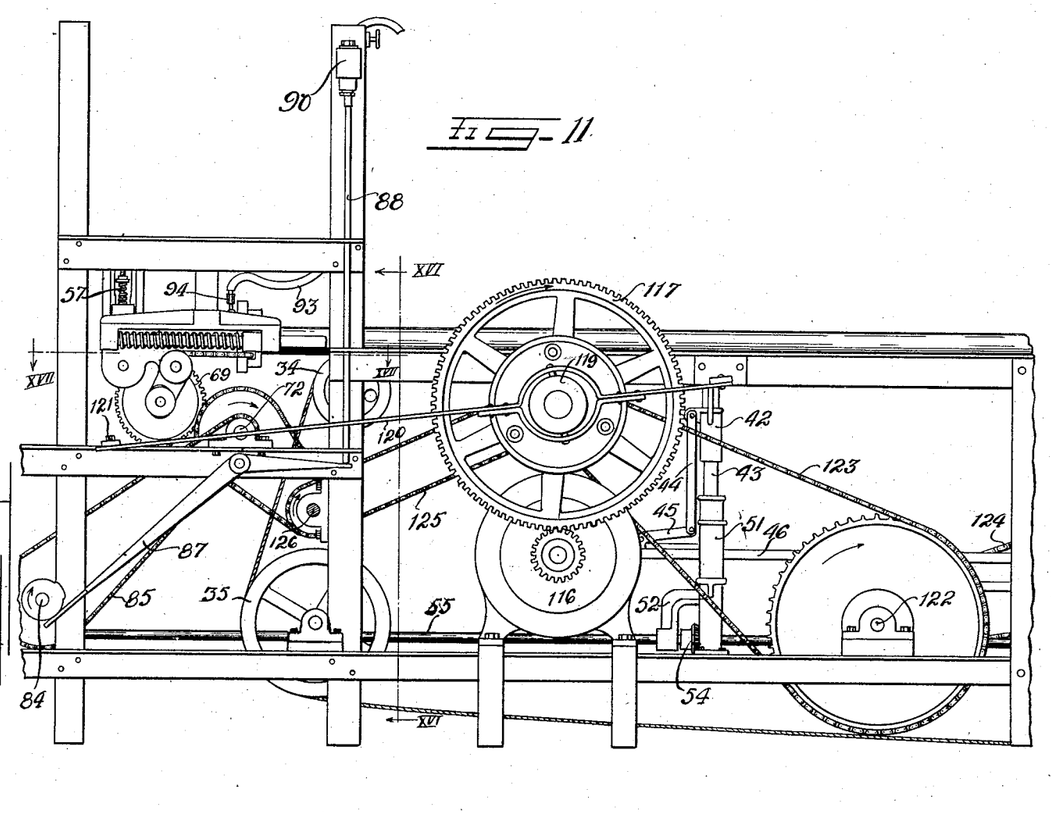
Figure 11 is an enlarged fragmentary side elevation of the stripping nozzle section together with the driving mechanism.
Figure 12:
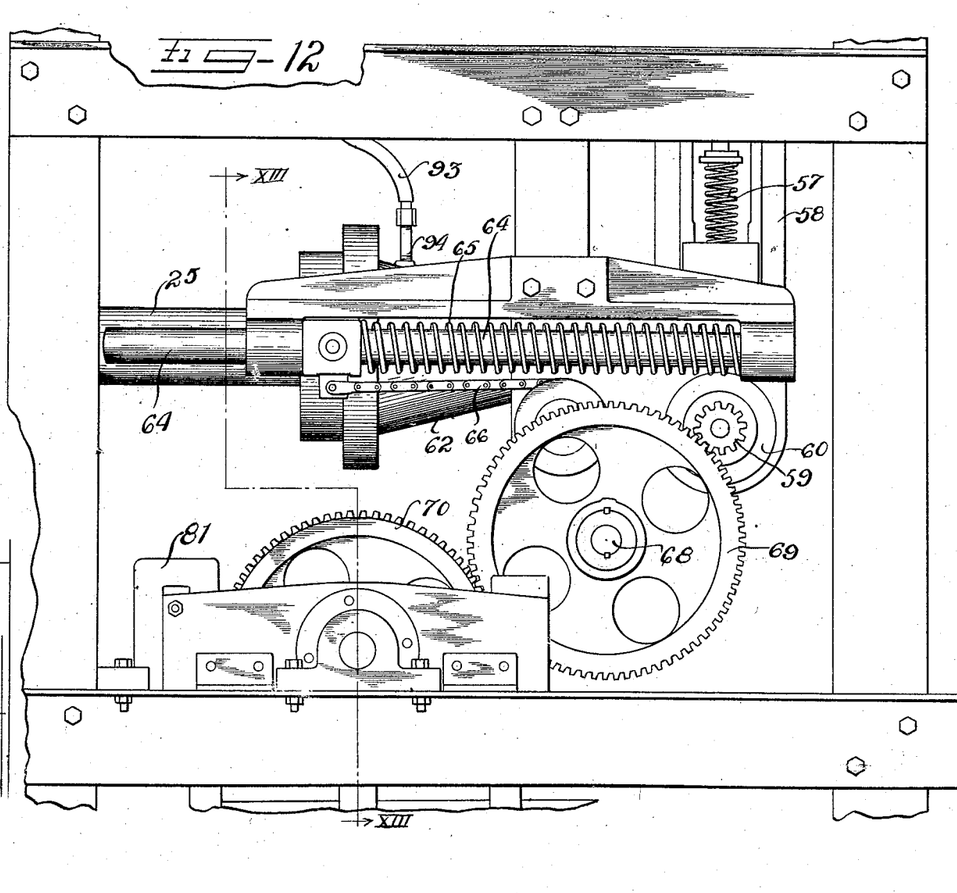
Figure 12 is a fragmentary enlarged elevation of the stripping nozzle mechanism.
Figures 13, 14:
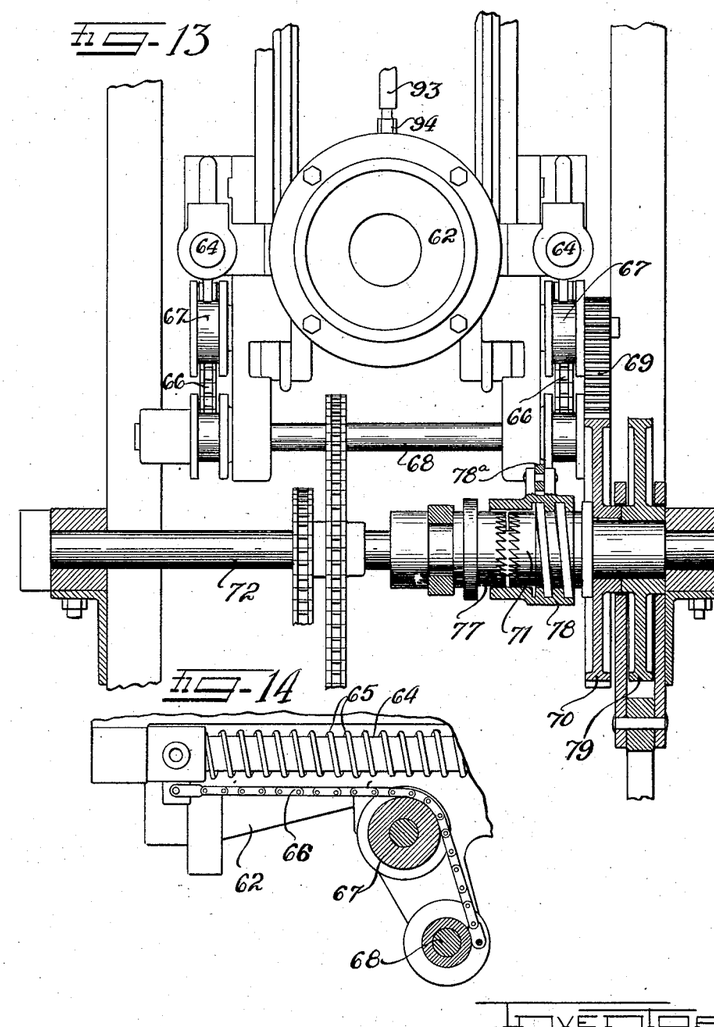
Figure 13 is a section on the line XIII—XIII of Figure 12.
Figure 14 is a fragmentary detail of the nozzle advancing mechanism.

This control shaft also actuates, by means of a lever 87 and tappet rod 88 shown in Figure 11, an air valve 89 seating in a valve body 90, as shown in section in Figure 23. The air enters the valve body through the supply pipe 91 and leaves through an outlet 92 being led through a hose 93 to a connection 94 at the conical nozzle. The rear of the nozzle 63 is sealed by a rubber gasket 95 which is pressed against the tube and mandrel by the air pressure in the nozzle.

The mandrel is initially pushed through the nozzle by the carriage, as previously described. As the stripped mandrel issues from the rear of the nozzle, it is supported by a guide roller 96, similar to those previously described, this roller being mounted on a vertically adjustable shaft 97 manually elevated in standards 98 by bevel gears 99 connected to an extension of the shaft 55 previously described. The automatic lowering mechanism used with the rollers 27 is not required for the roller 96, the manual adjustment being provided to center varying sizes of mandrels.

Even when the mandrel has completely passed through the stripping nozzle, it will be evident that half the tube length will still be thereon with the other half folded back thereover, so that a standard 100 is provided with upper and lower rollers 101 which are separately driven by chains 102 from a pair of stub shafts 103. These rollers serve to pull the mandrel free from the tube. The stub shaft is driven by a belt 104 from a pulley 105 on the counter shaft 126. The rollers 101 are mounted in vertically movable carriages 106 having right and left hand threaded apertures engaged by suitably threaded shafts 107 which are operable from a cross shaft 108 by bevel gears 109, the cross shaft being in turn operated by bevel gears 110 from the longitudinal shaft 55, so that all the guide rollers are simultaneously adjustable by means of the shaft 55, which is controlled alongside the nozzle station by a hand wheel 111 operating an index gear wheel 112 beneath a pointer 113, as shown in Figure 16, the hand wheel 111 operating a shaft 114 which connects to the longitudinal shaft 55 through bevel gears 115.

The driving mechanism for the various components of the machine previously described comprises a motor 116 driving a large gear wheel 117 on a counter shaft 118, the gear wheel being engaged on the shaft by means of a clutch 119 operated by levers 120 and 121. The counter shaft 118 drives a shaft 122 by means of a chain 123. This shaft 122 in turn drives, through a chain 124, the shaft 50, which operates the crank disc controlling the carriage drive sheaves and the cam for shifting the guide rollers 27. Another chain drive 125 from the counter shaft 118 drives a shaft 126, which in turn operates the shaft 72, which operates the nozzle, stripping rollers and final pull-through rollers 101.

A summarized description of the sequence of operations described hereinbefore in connection with the individual parts is given below. The mandrel with its tube is laid on the two guide rollers 27 which are in their elevated position at the start of the operation. The carriage 28 on its forward stroke pushes the forward end of the mandrel into the stripping nozzle 63, the mandrel being then supported by the carriage and nozzle, so that the guide roller cam 49 is timed to lower the guide rollers to permit the carriage to pass thereover. As the forward end of the tube approaches the stripping rollers 56, the cam 73 operates the clutch 71, thus starting the rollers and at the same time pulling the nozzle 62 into position so that the point 61 thereof advances under the edge of the tube as it is turned back by the stripping rollers. With the end of the tube gripped between the nozzle and the stripping rollers, the air valve 89 is opened and the clutch element 77 is thrown out by the nut 78, the nozzle and rollers being held stationary by the non-reversing clutch 79 until the stripping operation is completed. As the stripped mandrel clears the nozzle, it is pulled free of the tube and ejected from the machine by means of the rollers 101 while in the meantime the carriage 28 is returned to its starting position.

We are aware that many changes may be made and numerous details of construction may be varied through a wide range without departing from the principles of this invention, and we therefore do not purpose limiting the patent granted hereon, otherwise than as necessitated by the prior art.

We claim as our invention:

1. A tube stripping machine comprising means adapted to support and guide a tube mandrel, a carriage adapted to advance said mandrel, a pneumatic stripping nozzle, stripping means coacting with said nozzle and adapted to engage one end of the tube on said mandrel, and means automatically controlling the action of said stripping nozzle.

2. A tube stripping machine comprising means adapted to support and guide a tube mandrel, elevating means adapted to shift said supporting and guiding means at a predetermined time, a carriage adapted to advance said mandrel, a pneumatic stripping nozzle, stripping means coacting with said nozzle and adapted to engage one end of the tube on said mandrel, and means automatically controlling the action of said stripping nozzle.

3. A tube stripping machine comprising means adapted to support and guide a tube mandrel, a carriage adapted to advance said mandrel, a pneumatic stripping nozzle, means for advancing said nozzle into operative position, stripping means coacting with said nozzle and adapted to engage one end of the tube on said mandrel, and means automatically controlling the action of said stripping nozzle.

4. A tube stripping machine comprising means adapted to support and guide a tube mandrel, a carriage adapted to advance said mandrel, a pneumatic stripping nozzle, stripping means coacting with said nozzle and adapted to engage one end of the tube on said mandrel, a clutch adapted to intermittently operate said stripping means at predetermined intervals, and means automatically controlling the action of said stripping nozzle.

5. A tube stripping machine comprising means adapted to support and guide a tube mandrel, a carriage adapted to advance said mandrel, a pneumatic stripping nozzle, an automatic air valve control for said pneumatic stripping nozzle, stripping means coacting with said nozzle and adapted to engage one end of the tube on said mandrel, and means automatically controlling the action of said stripping nozzle.

6. A tube stripping machine comprising means adapted to support and guide a tube mandrel, elevating means adapted to shift said supporting and guiding means at a predetermined time, a carriage adapted to advance said mandrel, a pneumatic stripping nozzle, means for advancing said nozzle into operative position, stripping means coacting with said nozzle and adapted to engage one end of the tube on said mandrel, and means automatically controlling the action of said stripping nozzle.

7. A tube stripping machine comprising means adapted to support and guide a tube mandrel, elevating means adapted to shift said supporting and guiding means at a predetermined time, a carriage adapted to advance said mandrel, a pneumatic stripping nozzle, stripping means coacting with said nozzle and adapted to engage one end of the tube on said mandrel, a clutch adapted to intermittently operate said stripping means at predetermined intervals, and means automatically controlling the action of said stripping nozzle.

8. A tube stripping machine comprising means adapted to support and guide a tube mandrel, elevating means adapted to shift said supporting and guiding means at a predetermined time, a carriage adapted to advance said mandrel, a pneumatic stripping nozzle, an automatic air valve control for said pneumatic stripping nozzle, stripping means coacting with said nozzle and adapted to engage one end of the tube on said mandrel, and means automatically controlling the action of said stripping nozzle.

9. A tube stripping machine comprising means adapted to support and guide a tube mandrel, a carriage adapted to advance said mandrel, a pneumatic stripping nozzle, means for advancing said nozzle into operative position, stripping means coacting with said nozzle and adapted to engage one end of the tube on said mandrel, a clutch adapted to intermittently operate said stripping means at predetermined intervals, and means automatically controlling the action of said stripping nozzle.

10. A tube stripping machine comprising means adapted to support and guide a tube mandrel, a carriage adapted to advance said mandrel, a pneumatic stripping nozzle, an automatic air valve control for said pneumatic stripping nozzle, means for advancing said nozzle into operative position, stripping means coacting with said nozzle and adapted to engage one end of the tube on said mandrel, and means automatically controlling the action of said stripping nozzle.

11. A tube stripping machine comprising means adapted to support and guide a tube mandrel, a carriage adapted to advance said mandrel, a pneumatic stripping nozzle, an automatic air valve control for said pneumatic stripping nozzle, stripping means coacting with said nozzle and adapted to engage one end of the tube on said mandrel, a clutch adapted to intermittently operate said stripping means at predetermined intervals, and means automatically controlling the action of said stripping nozzle.

12. A tube stripping machine comprising means adapted to support and guide a tube mandrel, elevating means adapted to shift said supporting and guiding means at a predetermined time, a carriage adapted to advance said mandrel, a pneumatic stripping nozzle, means for advancing said nozzle into operative position, stripping means coacting with said nozzle and adapted to engage one end of the tube on said mandrel, a clutch adapted to intermittently operate said stripping means at predetermined intervals, and means automatically controlling the action of said stripping nozzle.

13. A tube stripping machine comprising means adapted to support and guide a tube mandrel, elevating means adapted to shift said supporting and guiding means at a predetermined time, a carriage adapted to advance said mandrel, a pneumatic stripping nozzle, means for advancing said nozzle into operative position, an automatic air valve control for said pneumatic stripping nozzle, stripping means coacting with said nozzle and adapted to engage one end of the tube on said mandrel, and means automatically controlling the action of said stripping nozzle.

14. A tube stripping machine comprising means adapted to support and guide a tube mandrel, elevating means adapted to shift said supporting and guiding means at a predetermined time, a carriage adapted to advance said mandrel, a pneumatic stripping nozzle, means for advancing said nozzle into operative position, an automatic air valve control for said pneumatic stripping nozzle, stripping means coacting with said nozzle and adapted to engage one end of the tube on said mandrel, a clutch adapted to intermittently operate said stripping means at predetermined intervals, and means automatically controlling the action of said stripping nozzle.

15. A tube stripping machine comprising means adapted to support and guide a tube mandrel, a carriage adapted to advance said mandrel, a pneumatic stripping nozzle, an automatic air valve control for said pneumatic stripping nozzle, means for advancing said nozzle into operative position, stripping means coacting with said nozzle and adapted to engage one end of the tube on said mandrel, a clutch adapted to intermittently operate said stripping means at predetermined intervals, and means automatically controlling the action of said stripping nozzle.

16. A device of the class described comprising in combination tube mandrel supporting and advancing mechanisms, a stripping nozzle associated with said mandrel, and stripping rollers coacting with said nozzle to engage the end of a tube on said mandrel.

17. A device of the class described comprising in combination tube mandrel supporting, elevating and advancing mechanisms, a stripping nozzle associated with said mandrel, and stripping rollers coacting with said nozzle to engage the end of a tube on said mandrel.

18. A device of the class described comprising in combination tube mandrel supporting and advancing mechanisms, a pneumatic stripping nozzle associated with said mandrel, and stripping rollers coacting with said nozzle to engage the end of a tube on said mandrel.

19. A device of the class described comprising in combination tube mandrel supporting and advancing mechanisms, a stripping nozzle associated with said mandrel, means for advancing said nozzle into operative position, and stripping rollers coacting with said nozzle when advanced to engage the end of a tube on said mandrel.

20. A device of the class described comprising in combination tube mandrel supporting and advancing mechanisms, a stripping nozzle aligned with the axis of said mandrel, stripping rollers coacting with said nozzle to engage the end of a tube on said mandrel, and means adapted to intermittently release said stripping rollers to permit easy withdrawal of the mandrel.

21. A device of the class described comprising in combination tube mandrel supporting and advancing mechanisms, a stripping nozzle aligned with the axis of said mandrel, stripping rollers coacting with said nozzle to engage the end of a tube on said mandrel, and means automatically controlling the coaction of said nozzle and stripping rollers.

22. A device of the class described comprising in combination tube mandrel supporting, elevating and advancing mechanisms, a pneumatic stripping nozzle aligned with the axis of said mandrel, and stripping rollers coacting with said nozzle to engage the end of a tube on said mandrel.

23. A device of the class described comprising in combination tube mandrel supporting, elevating and advancing mechanisms, a stripping nozzle aligned with the axis of said mandrel, means for advancing said nozzle into operative position, and stripping rollers coacting with said nozzle when advanced to engage the end of a tube on said mandrel.

24. A device of the class described comprising in combination tube mandrel supporting, elevating and advancing mechanisms, a stripping nozzle aligned with the axis of said mandrel, stripping rollers coacting with said nozzle to engage the end of a tube on said mandrel, and means adapted to intermittently release said stripping rollers to permit easy withdrawal of the mandrel.

25. A device of the class described comprising in combination tube mandrel supporting, elevating and advancing mechanisms, a stripping nozzle aligned with the axis of said mandrel, stripping rollers coacting with said nozzle to engage the end of a tube on said mandrel, and means automatically controlling the coaction of said nozzle and stripping rollers.

26. A device of the class described comprising in combination tube mandrel supporting, elevating and advancing mechanisms, a pneumatic stripping nozzle aligned with the axis of said mandrel, means for advancing said nozzle into operative position, and stripping rollers coacting with said nozzle when advanced to engage the end of a tube on said mandrel.

27. A device of the class described comprising in combination tube mandrel supporting, elevating and advancing mechanisms, a pneumatic stripping nozzle aligned with the axis of said mandrel, means for advancing said nozzle into operative position, stripping rollers coacting with said nozzle when advanced to engage the end of a tube on said mandrel, and means adapted to intermittently release said stripping rollers to permit easy withdrawal of the mandrel.

28. A device of the class described comprising in combination tube mandrel supporting, elevating and advancing mechanisms, a pneumatic stripping nozzle aligned with the axis of said mandrel, means for advancing said nozzle into operative position, stripping rollers coacting with said nozzle when advanced to engage the end of a tube on said mandrel, and means automatically controlling the coaction of said nozzle and stripping rollers.

29. A device of the class described comprising in combination tube mandrel supporting and advancing mechanisms, a pneumatic stripping nozzle associated with said mandrel, means for advancing said nozzle into operative position, and stripping rollers coacting with said nozzle when advanced to engage the end of a tube on said mandrel.

30. A device of the class described comprising in combination tube mandrel supporting and advancing mechanisms, a pneumatic stripping nozzle aligned with the axis of said mandrel, means for advancing said nozzle into operative position, stripping rollers coacting with said nozzle when advanced to engage the end of a tube on said mandrel, and means adapted to intermittently release said stripping rollers to permit easy withdrawal of the mandrel.

31. A device of the class described comprising in combination tube mandrel supporting and advancing mechanisms, a pneumatic stripping nozzle aligned with the axis of said mandrel, means for advancing said nozzle into operative position, stripping rollers coacting with said nozzle when advanced to engage the end of a tube on said mandrel, and means automatically controlling the coaction of said nozzle and stripping rollers.

32. A device of the class described comprising in combination tube mandrel supporting and advancing mechanisms, a stripping nozzle aligned with the axis of said mandrel, means for advancing said nozzle into operative position, stripping rollers coacting with said nozzle when advanced to engage the end of a tube on said mandrel, and means adapted to intermittently release said stripping rollers to permit easy withdrawal of the mandrel.

33. A device of the class described comprising in combination tube mandrel supporting and advancing mechanisms, a stripping nozzle aligned with the axis of said mandrel, means for advancing said nozzle into operative position, stripping rollers coacting with said nozzle when advanced to engage the end of a tube on said mandrel, and means automatically controlling the coaction of said nozzle and stripping rollers.

34. In a machine of the class described, a carriage for feeding a tube mandrel, means for advancing and retracting said carriage, a stripping nozzle, stripping means adapted to turn back the end of the tube on the mandrel, means for advancing the end of said nozzle beneath the turned back end of the tube, means adapted to hold the stripping means and nozzle stationary with the end of the tube gripped therebetween, and means for supplying fluid under pressure to said nozzle during the stripping operation.

35. In a machine of the class described, a carriage for feeding a tube mandrel, means for advancing and retracting said carriage, a stripping nozzle, stripping means adapted to turn back the end of the tube on the mandrel, means for advancing the end of said nozzle beneath the turned back end of the tube, means adapted to hold the stripping means and nozzle stationary with the end of the tube gripped therebetween, means for releasing said holding means upon completion of the stripping operation, and means for supplying fluid under pressure to said nozzle during the stripping operation.

36. In a machine of the class described, a carriage for feeding a tube mandrel, means for advancing and retracting said carriage, a stripping nozzle, stripping means adapted to turn back the end of the tube on the mandrel, means for advancing the end of said nozzle beneath the turned back end of the tube, means adapted to hold the stripping means and nozzle stationary with the end of the tube gripped therebetween, and means for ejecting the stripped mandrel from the machine.

37. In a machine of the class described, a carriage for feeding a tube mandrel, means for advancing and retracting said carriage, a stripping nozzle, stripping means adapted to turn back the end of the tube on the mandrel, means for advancing the end of said nozzle beneath the turned back end of the tube, means adapted to hold the stripping means and nozzle stationary with the end of the tube gripped therebetween, means for releasing said holding means upon completion of the stripping operation, and means for ejecting the stripped mandrel from the machine.

38. In a machine of the class described, a carriage for feeding a tube mandrel, means for advancing and retracting said carriage, including a quick return motion, a stripping nozzle, stripping means adapted to turn back the end of the tube on the mandrel, means for advancing the end of said nozzle beneath the turned back end of the tube, means adapted to hold the stripping means and nozzle stationary with the end of the tube gripped therebetween, and means for supplying fluid under pressure to said nozzle during the stripping operation.

39. In a machine of the class described, a carriage for feeding a tube mandrel, means for advancing and retracting said carriage, a stripping nozzle, stripping means adapted to turn back the end of the tube on the mandrel, driving means for said stripping means, means for advancing said nozzle beneath the turned back end of said tube, a clutch controlling the driving and advancing means, means adapted to throw out said clutch after a predetermined movement thereof, and means adapted to hold the stripping means and nozzle stationary after said clutch is thrown out.

40. In a machine of the class described, a carriage for feeding a tube mandrel, means for advancing and retracting said carriage, a stripping nozzle, stripping means adapted to turn back the end of the tube on the mandrel, driving means for said stripping means, means for advancing said nozzle beneath the turned back end of said tube, a clutch controlling the driving and advancing means, means adapted to throw out said clutch after a predetermined movement thereof, means adapted to hold the stripping means and nozzle stationary after said clutch is thrown out, and means adapted to release said holding means after a predetermined interval.

41. In a machine of the class described, a carriage for feeding a tube mandrel, means for advancing and retracting said carriage, a stripping nozzle, stripping means adapted to turn back the end of the tube on the mandrel, driving means for said stripping means, means for advancing said nozzle beneath the turned back end of said tube, a clutch controlling the driving and advancing means, means adapted to throw out said clutch after a predetermined movement thereof, means adapted to hold the stripping means and nozzle stationary after said clutch is thrown out, and means for ejecting the stripped mandrel from the machine.

42. In a machine of the class described, a carriage for feeding a tube mandrel, means for advancing and retracting said carriage, a stripping nozzle, stripping means adapted to turn back the end of the tube on the mandrel, driving means for said stripping means, means for advancing said nozzle beneath the turned back end of said tube, a clutch controlling the driving and advancing means, means adapted to throw out said clutch after a predetermined movement thereof, means adapted to hold the stripping means and nozzle stationary after said clutch is thrown out, means adapted to release said holding means after a predetermined interval, and means for ejecting the stripped mandrel from the machine.

43. In a machine of the class described, a carriage for feeding a tube mandrel, means for advancing and retracting said carriage, including a quick return motion, a stripping nozzle, stripping means adapted to turn back the end of the tube on the mandrel, driving means for said stripping means, means for advancing said nozzle beneath the turned back end of said tube, a clutch controlling the driving and advancing means, means adapted to throw out said clutch after a predetermined movement thereof, and means adapted to hold the stripping means and nozzle stationary after said clutch is thrown out.

44. In a machine of the class described, a carriage for feeding a tube mandrel, means for advancing and retracting said carriage, including a quick return motion, a stripping nozzle, stripping means adapted to turn back the end of the tube on the mandrel, driving means for said stripping means, means for advancing said nozzle beneath the turned back end of said tube, a clutch controlling the driving and advancing means, means adapted to throw out said clutch after a predetermined movement thereof, means adapted to hold the stripping means and nozzle stationary after said clutch is thrown out, and means adapted to release said holding means after a predetermined interval.

45. In a machine of the class described, a carriage for feeding a tube mandrel, means for advancing and retracting said carriage, including a quick return motion, a stripping nozzle, stripping means adapted to turn back the end of the tube on the mandrel, driving means for said stripping means, means for advancing said nozzle beneath the turned back end of said tube, a clutch controlling the driving and advancing means, means adapted to throw out said clutch after a predetermined movement thereof, means adapted to hold the stripping means and nozzle stationary after said clutch is thrown out, and means for ejecting the stripped mandrel from the machine.

46. In a machine for stripping a tube from a mandrel, means for initially supporting the mandrel with the tube thereon, means for engaging the mandrel to move it forward to a stripping position, means for removing the supporting means out of the path of the engaging means and means at the stripping position for removing the tube from the mandrel.

47. In a machine for stripping a tube from a mandrel, means for initially supporting the mandrel with the tube thereon, means for engaging the mandrel to move it forward to a stripping position, said supporting means comprising spaced rollers initially movable into position to receive and support said mandrel and subsequently lowerable out of the path of said engaging means prior to the stripping operation.

48. In a machine for stripping a tube from a mandrel, means for supporting the mandrel with a tube thereon, stripping means associated therewith, means for causing relative movement between the supporting means and stripping means to advance said mandrel and means controlled by the forward movement of the mandrel for controlling the action of said stripping means on said tube.

49. In a machine for stripping a tube from a mandrel, means for supporting the mandrel with a tube thereon, stripping means associated therewith, means for causing relative movement between the supporting means and stripping means to advance said mandrel and means controlled by the forward movement of the mandrel for controlling the action of said stripping means on said tube, said stripping means including a stripping nozzle for receiving the mandrel with the tube thereon and which is arranged to be pulled into a stripping position by the forward movement of said mandrel.

50. In a machine for stripping a tube from a mandrel, means for supporting the mandrel with a tube thereon, stripping mechanism for removing the tube from the mandrel including means for automatically turning back an end of the tube upon itself and means for causing a relative movement between said supporting means and said stripping mechanism to cause said tube to be progressively removed from the mandrel.

51. In a machine for stripping a tube from a mandrel, means for supporting the mandrel with a tube thereon, stripping mechanism for removing the tube from the mandrel including means for turning back an end of the tube upon itself, means for causing a relative movement between said supporting means and said stripping mechanism to cause said tube to be progressively removed from the mandrel and means for automatically forcing air under said turned back end controlled by said last mentioned means.

52. In a machine for stripping a tube from a mandrel, means for supporting the mandrel with a tube thereon, stripping mechanism for removing the tube from the mandrel including a nozzle through which the mandrel and tube are adapted to pass and means for turning an end of said tube back upon itself and upon said nozzle and means for causing a relative movement between said supporting means and said stripping mechanism to cause said tube to be progressively removed from the mandrel.

53. In a machine for stripping a tube from a mandrel, means for supporting the mandrel with a tube thereon, stripping mechanism for removing the tube from the mandrel including a nozzle through which the mandrel and tube are adapted to pass and means for turning an end of said tube back upon itself and upon said nozzle, means for causing a relative movement between said supporting means and said stripping mechanism to cause said tube to be progressively removed from the mandrel and means for automatically forcing air through said nozzle under said turned back end of said tube while said nozzle and said turning back means are held stationary to secure the turned back end of the tube to said nozzle.

54. In a machine for stripping a tube from a mandrel, means for supporting the mandrel with a tube thereon, stripping mechanism for removing the tube from the mandrel including means for turning back an end of the tube upon itself, means for causing a relative movement between said supporting means and said stripping mechanism to cause said tube to be progressively removed from the mandrel and means for discharging the mandrel from said machine after the tube has been removed therefrom.

55. In a machine for stripping a tube from a mandrel, means for supporting the mandrel with a tube thereon, stripping mechanism for removing the tube from the mandrel including means for automatically turning back an end of the tube upon itself and means for causing a relative movement between said supporting means and said stripping mechanism to cause said tube to be progressively removed from the mandrel, said stripping means including adjustably mounted gripping elements for holding the turned back end of the tube against displacement during the stripping operation.

In testimony whereof, we have hereunto subscribed our names at Eau Claire, Eau Claire County, Wisconsin.

ARNOLD R. KRAUSE.
ALFRED C. HIRSCH.